US 007652256B2

(12) United States Patent  
Lusser

(10) Patent No.: US 7,652,256 B2
(45) Date of Patent: Jan. 26, 2010

(54) SOLID STATE BASED PET RETROFIT FOR A CT SCANNER

(75) Inventor: Markus Lusser, Cary, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 11/480,614

(22) Filed: Jul. 3, 2006

(65) Prior Publication Data

US 2008/0001089 A1  Jan. 3, 2008

(51) Int. Cl.
*G01T 1/166* (2006.01)
*G01T 1/164* (2006.01)
*G01T 1/161* (2006.01)

(52) U.S. Cl. .................... 250/363.05; 250/363.02; 250/363.08

(58) Field of Classification Search ............ 250/363.02, 250/363.05, 363.08, 363.03
See application file for complete search history.

(56) References Cited

U.S. PATENT DOCUMENTS

| 6,292,311 | B1 * | 9/2001 | Bohn et al. ................ 359/819 |
| 6,449,331 | B1 | 9/2002 | Nutt et al. |
| 6,490,476 | B1 | 12/2002 | Townsend et al. |
| 6,631,284 | B2 | 10/2003 | Nutt et al. |
| 6,831,961 | B1 * | 12/2004 | Tybinkowski et al. ......... 378/4 |
| 6,858,847 | B1 | 2/2005 | Macciocchi |
| 6,961,606 | B2 * | 11/2005 | DeSilets et al. ............. 600/415 |
| 2005/0207530 | A1 * | 9/2005 | Inoue et al. ................. 378/63 |

\* cited by examiner

*Primary Examiner*—David P Porta
*Assistant Examiner*—Carolyn Igyarto
(74) *Attorney, Agent, or Firm*—Peter L. Kendall

(57) ABSTRACT

A solid state PET module for retrofitting to a standalone CT scanner generally includes a housing that is insertable into at least a portion of a bore opening of a gantry of the CT scanner. The housing includes a number of PET coincidence detectors, which are preferably solid state APD detectors. The module may include a base for supporting the module on a floor or platform of the CT scanner, or may be in the form of a disk securably fastened to the CT scanner gantry.

16 Claims, 8 Drawing Sheets

SOLID STATE BASED PET RETROFIT FOR A CT SCANNER

FIELD OF THE INVENTION

The instant invention relates generally to nuclear medical imaging devices, and more specifically, to a solid state PET module that is used in conjunction with an existing CT imaging device such that both diagnostic modalities can be conducted in a single scanning session.

BACKGROUND OF THE INVENTION

Nuclear medicine is a unique medical specialty wherein radiation is used to acquire images which show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions which emanate from the body and are captured by a scintillation crystal, with which the photons interact to produce flashes of light or "events." Events are detected by an array of photodetectors, such as photomultiplier tubes, and their spatial locations or positions are calculated and stored. In this way an image of the organ or tissue under study is created from detection of the distribution of the radioisotopes in the body.

In nuclear imaging, a patient is injected with or swallows a radioactive isotope which has an affinity for a particular organ structure or tissue of the body. Gamma rays are then emitted from the body part of interest are collimated by a collimator so that only gamma photons travelino in a direction perpendicular to the surface of a detector head are allowed to impinge on the detector head, and are detected by a gamma camera apparatus including the detector head, which forms an image of the organ based on the detected concentration and distribution of the radioactive isotope within the body part of interest. Nuclear images may be obtained using SPECT (Single Photon Emission Computed Tomography), or PET (Positron Emission Tomography). SPECT produces multiple image "slices" from single gamma photons, each slice representing a different plane in a three-dimensional region such that when the slices are considered collectively, a three-dimensional image of the region may be studied.

PET is used to produce images for diagnosing the biochemistry or physiology of a specific organ, tumor or other metabolically active site. Measurement of the tissue concentration of a positron emitting radionuclide is based on coincidence detection of the two gamma photons arising from positron annihilation. When a positron is annihilated by an electron, two 511 keV gamma photons are simultaneously produced and travel in approximately opposite directions. Gamma photons produced by an annihilation event can be detected by a pair of oppositely disposed radiation detectors capable of producing a signal in response to the interaction of the gamma photons with a scintillation crystal. Annihilation events are typically identified by a time coincidence between the detection of the two 511 keV gamma photons in the two oppositely disposed detectors, i.e., the gamma photon emissions are detected virtually simultaneously by each detector. When two oppositely disposed gamma photons each strike an oppositely disposed detector to produce a time coincidence event, they also identify a line of response, or LOR, along which the annihilation event has occurred. An example of a PET method and apparatus is described in U.S. Pat. No. 6,858,847, which patent is incorporated herein by reference in its entirety.

Another known tomography system is computed axial tomography (CAT, or now also referred to as CT, XCT, or x-ray CT). In CT, an external x-ray source is caused to be passed around a patient. Detectors around the patient then respond to the x-ray transmission through the patient to produce an image of the area of study. Unlike PET, which is an emission tomography technique because it relies on detecting radiation emitted from inside the patient, CT is a transmission tomography technique which utilizes a radiation source external to the patient. CT provides images of the internal structures of the body, such as the bones, whereas PET, as described above, provides images of the functional or metabolic aspects of organs or tissues of the body.

A CT scanner uses a similar mechanical setup as a PET scanner. However, unlike PET, a CT scanner requires a source of x-ray radiation mounted opposite a detector. In third-generation computed tomography systems, the CT detector and x-ray source are mounted on diametrically opposite sides of a gantry which is rotated around the patient as the patient traverses the tunnel of the gantry.

The x-ray source of a CT imaging device typically emits a fan-shaped beam of x-rays which pass through the patient and are received by an array of detectors. As the x-rays pass through the patient, they are attenuated as a function of the densities of objects in their path. The output signal generated by each detector is representative of the electron densities of all objects between the x-ray source and the detector.

The CT detectors can utilize scintillator crystals which are sensitive to the energy level of the x-rays. Multiple light pulses produced by each scintillator crystal as it interacts with the x-rays are integrated to produce an output signal which is related to the number of the x-rays sensed by the scintillator crystal. The individual output signals are then collectively processed to generate a CT image. Other detectors can be used in CT tomographs. For example, a solid state silicon diode can be used to detect the low energy x-rays directly.

CT imaging is generally suited for providing anatomical and structural information, whereas PET is more adept for studying the biochemistry or physiology of a specific organ, tumor or other metabolically active site. Consequently, it is particularly useful in certain studies such as oncological, neurological and cardiovascular studies to use PET imaging for diagnostic purposes, and to align or register the nuclear image with a medical image from another modality such as CT, which offers better anatomical information. Such a fused image, for example, enables clinicians to determine the anatomical position of a lesion displayed by the nuclear image more accurately and the organs and structures that are affected can be ascertained with a higher degree of accuracy and confidence.

Hybrid imaging devices, which combine the functional sensitivity of PET with the anatomical detail of diagnostic multi-slice CT in a single, integral imaging device generally are known in the art, see, e.g. U.S. Pat. Nos. 6,449,331, 6,490,476 and 6,631,284, incorporated herein by reference in their entirety. However, such integrated devices are costly and impractical for diagnostic service providers that already possess stand alone-type CT imaging devices. Indeed, it may not be economically feasible for a diagnostic service provider to purchase a new, integrated hybrid device when such individual already possesses a stand alone-type CT imaging device. Additionally, in many instances, clinicians may have already constructed special buildings or rooms with which to house their existing stand alone-type CT imaging device such that the purchase of a new hybrid device may require the demolition and/or construction of a new building or room—which can be undesirable and/or cost prohibitive. Consequently, there is a need for a mobile compact SPECT imaging device that can be retrofitted with an existing stand alone-type CT imaging device to thereby form a hybrid device.

SUMMARY OF THE INVENTION

A solid state PET module according to the instant invention generally comprises a housing that is insertable into at least a portion of a bore opening of a gantry of a CT scanner. The housing includes a number of PET coincidence detectors, which are preferably solid state APD detectors. The module may include a base for supporting the module on a floor or platform of the CT scanner, or may be in the form of a disk securably fastened to the CT scanner gantry. According to a first embodiment, a PET insert module includes a base that supports the PET insert module when retrofitted to the CT imaging device. According to another embodiment, a number of scintillation detectors are aligned so as to be offset with respect to alignment of a CT detector of an CT imaging device when a PET insert module is retrofitted to the CT imaging device.

BRIEF DESCRIPTION OF THE DRAWINGS

An exemplary embodiment of the instant invention will now be more fully described in the detailed description and accompanying figures that follow in which.

DETAILED DESCRIPTION OF EXEMPLARY EMBODIMENTS

At the outset, it should be appreciated that the term/phrase "retrofit" and related terms/phrases is intended to refer to the fact that the present invention is configured to be combined, used in combination with, and/or mated with an existing stand alone-type CT imaging device.

Figure 1:
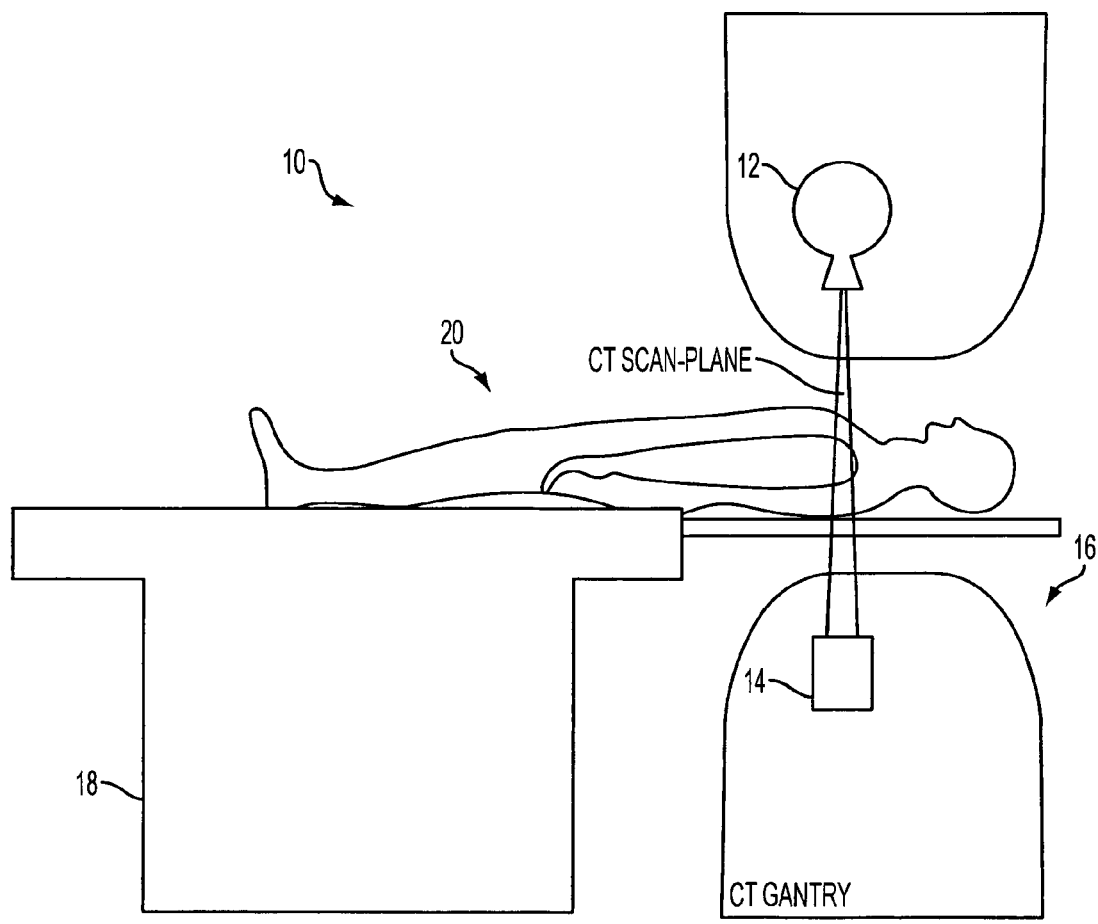
FIG. 1 is a perspective view of a known stand alone-type CT imaging device.

Referring now to the Figures, FIG. 1 illustrates an example of a known stand alone-type CT imaging device 10. Known stand alone-type CT imaging device 10 generally comprises an x-ray source 12, an x-ray detector 14, gantry 16 and patient table 18. Table 18 is generally provided for supporting a subject to be examined thereon and can be inserted into and out of the tunnel/orifice of the gantry 16 as shown. Gantry 16, which forms an annulus, is provided for supporting and rotating one or more radiation sources 12 and corresponding detectors 14 about a subject 20 to be examined such that image data regarding the subject can be collected. Such types of stand alone CT imaging devices are typically substantial in size and weight, have large footprints and are immobile. Often, rooms and/or buildings must be specifically constructed and/or designed in order to house such stand-alone CT imaging devices.

Figure 2:
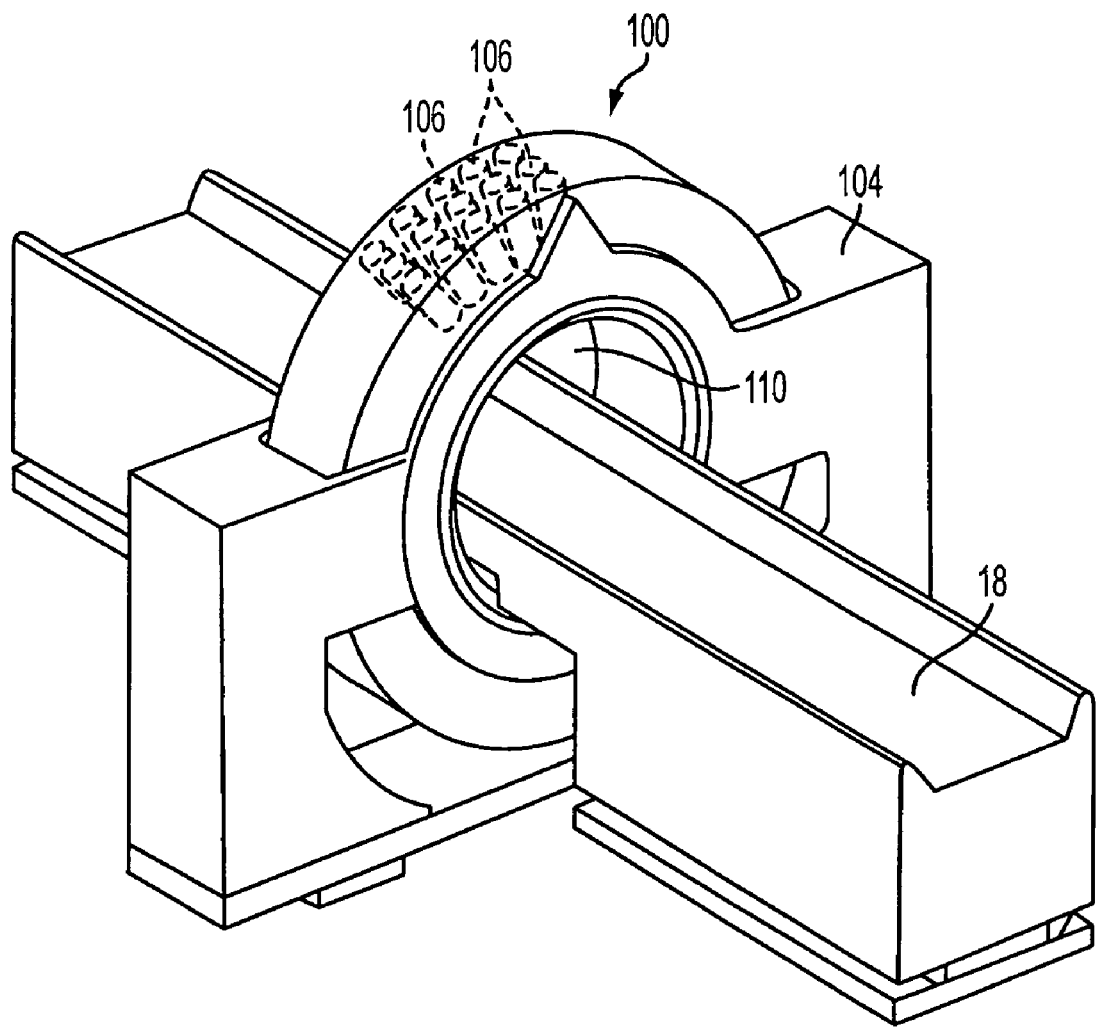
FIG. 2 is a perspective view of a known stand alone-type PET imaging device.

Referring now to FIG. 2, an example of a known standalone-type PET imaging device 100 is seen as broadly comprising patient table 18, gantry 104, and a plurality of detectors 106. Table 18 is generally provided for supporting a subject thereon and is movable in and out of tunnel/orifice 110 of the gantry 104. Gantry 104 forms an annulus and is provided for supporting detectors 106 about the subject to be imaged. The detectors 106 are in the form of ring detectors, with three rings being illustrated as an example, which correspond to three different tomographic planes. However, any number of planes may be implemented, including only a single ring detector. Generally, each of the detectors 106 comprises a scintillation crystal that converts radiation that is received into flashes or scintillations of light, and photomultiplier tubes (PMTs) which receive and detect the flashes of light and convert them into electrical signals such that image data regarding the subject may be obtained. Each of the detectors 106 has a counterpart detector disposed 180° opposite to it in the gantry. True coincidence events are detected and stored when scintillations occur simultaneously in 180° spaced-apart detectors. Such types of stand alone-type PET imaging devices also are typically substantial in size and weight, have large footprints and are immobile. Much like stand alone-type CT imaging devices, these devices also typically require that a special building or room be constructed to accommodate the device.

Figure 3:
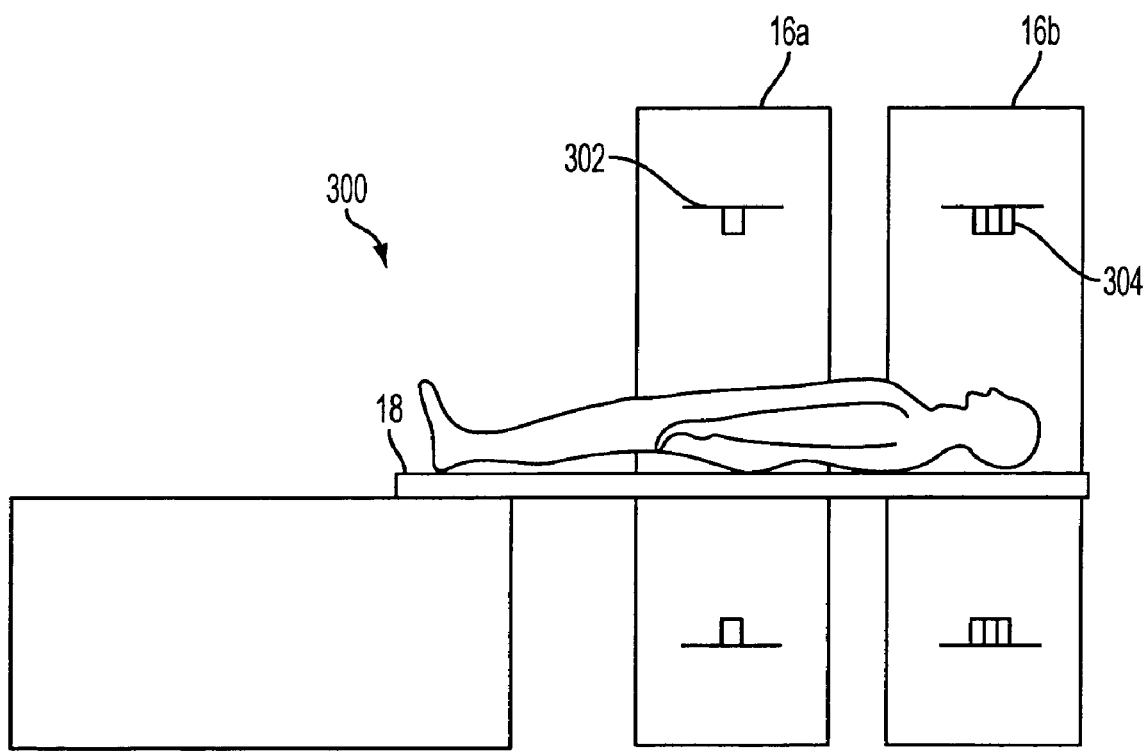
FIG. 3 is a perspective illustration of a known integrated PET/CT imaging device.

Referring now to FIG. 3, an example of a known integrated PET/CT imaging device 300 is illustrated as broadly comprising table 18, CT gantry housing 16a, CT scanner/detector assembly 302, PET gantry housing 16b, and PET detector assembly 304. Table 18 is generally provided for supporting a subject thereon. Gantry housings 16a and 16b form an annulus, which supports internal x-ray radiation source(s) and detector(s) therefor for performing CT analyses and which also supports scintillating PET ring detectors 304 for performing PET analyses on a gamma radiation field distributed within the patient. These devices are also typically substantial in size and weight, have large footprints and are generally immobile.

Figure 4:
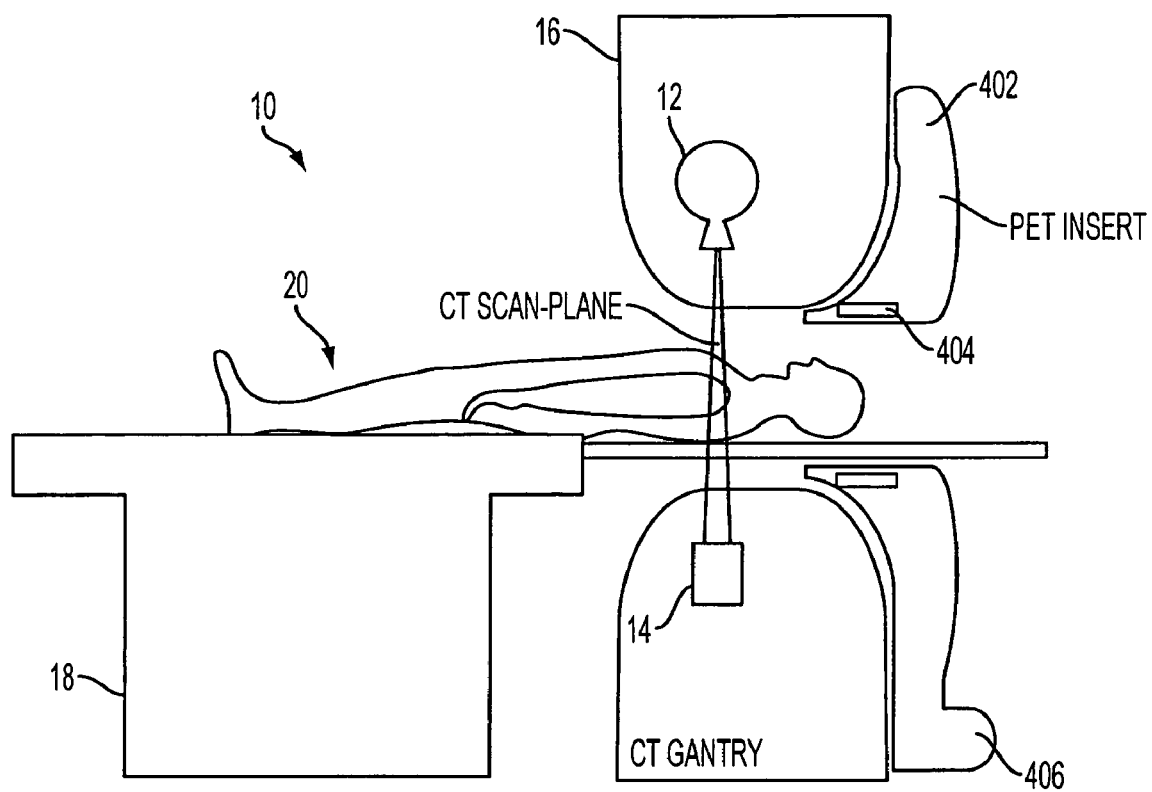
FIG. 4 is a cross-sectional view of a retrofit of an existing stand alone-type CT imaging device with a solid state PET module according to one embodiment of the instant invention.

Referring now to FIG. 4, according to one embodiment of the present invention, known stand-alone CT imaging device 10 is retrofitted with a removably positionable PET insert module 402. More specifically, PET insert module is illustrated as being positioned adjacent to CT gantry 16 and extending partially within the tunnel or bore of gantry 16 to surround patient table 18. The PET insert module 402 includes a plurality of detectors 404, which preferably comprise solid state APD (Avalanche PhotoDiode) detectors 404, preferably arranged in a ring configuration. As shown, the tomographic plane of the APD detectors is offset from the CT scan-plane, such that simultaneous CT and PET studies may be performed on patient 20.

The PET module 402 also may include associated signal processing circuitry for developing PET detector signals to be outputted to an image processor and/or operator workstation (not shown).

Figure 5:
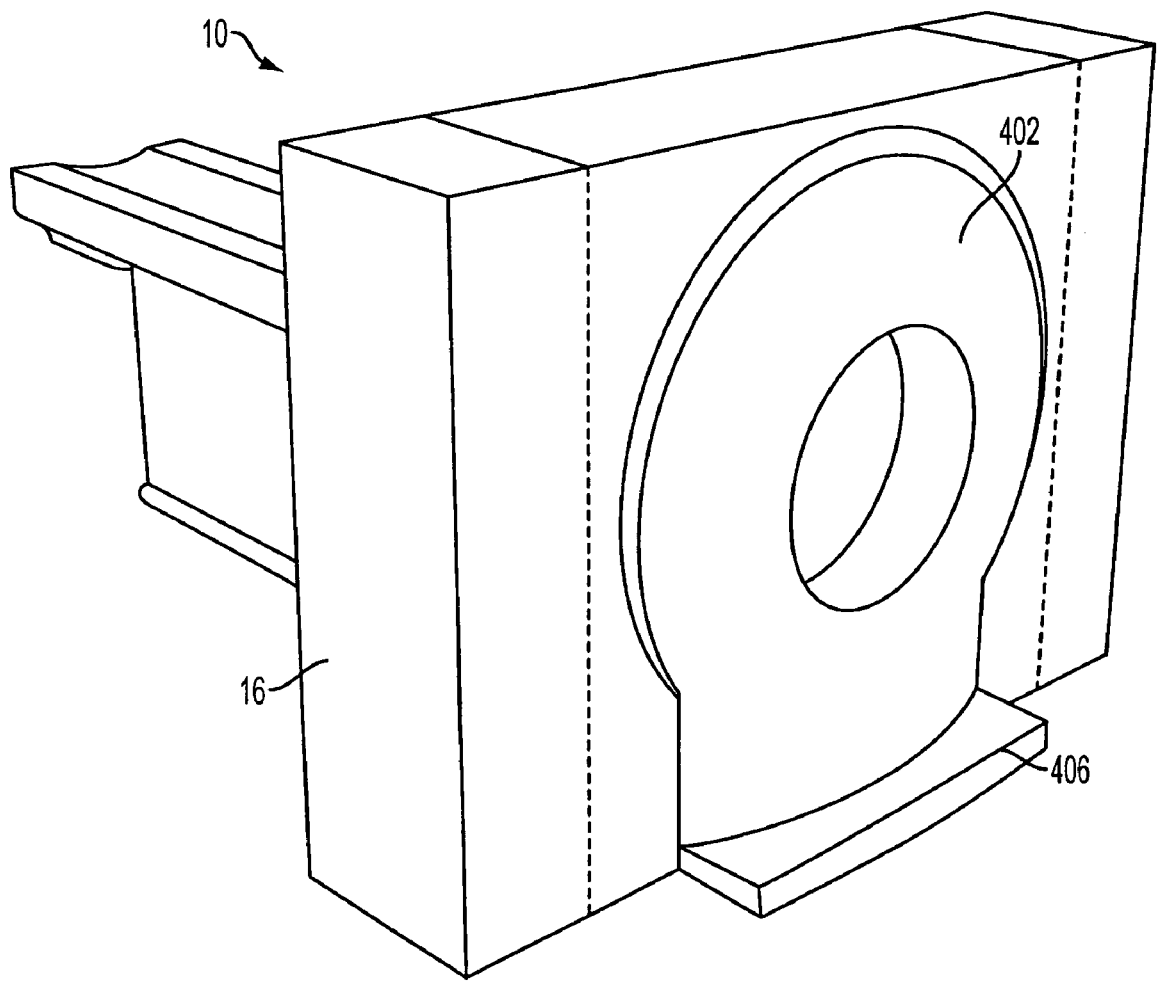
FIG. 5 is a perspective view of the embodiment of FIG. 4.
Figure 6:
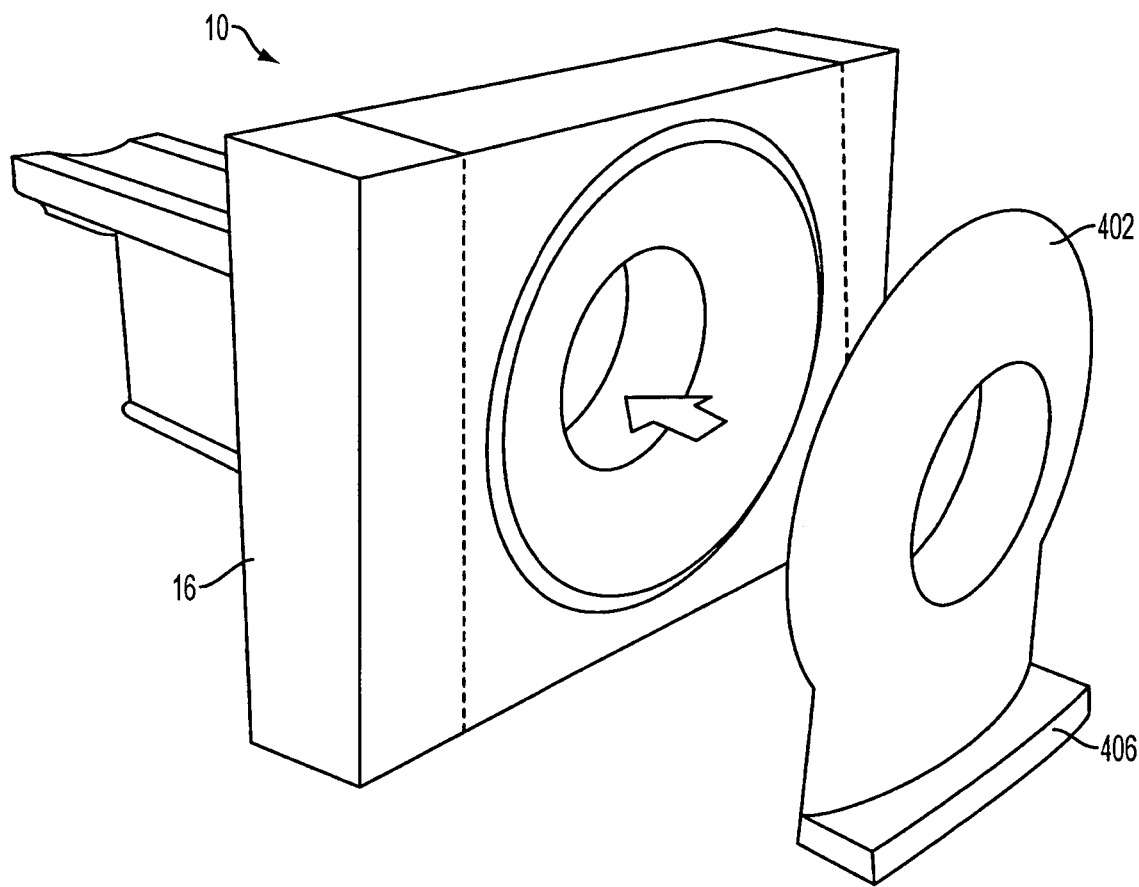
FIG. 6 is a perspective view showing the insertion of the PET module according to the embodiment of FIG. 4 into the stand alone CT imaging device.

As illustrated more clearly in FIGS. 5 and 6, according to a first embodiment, the PET insert module has a base 406 for supporting the weight of the PET insert module on the floor or other platform on which the standalone CT apparatus 10 is supported. FIG. 6 illustrates how the PET insert module 402 may be retrofitted to the CT scanner apparatus 10 by sliding the module 402 along the floor or platform into receiving position within the bore or tunnel of the CT apparatus 10.

Figure 7:
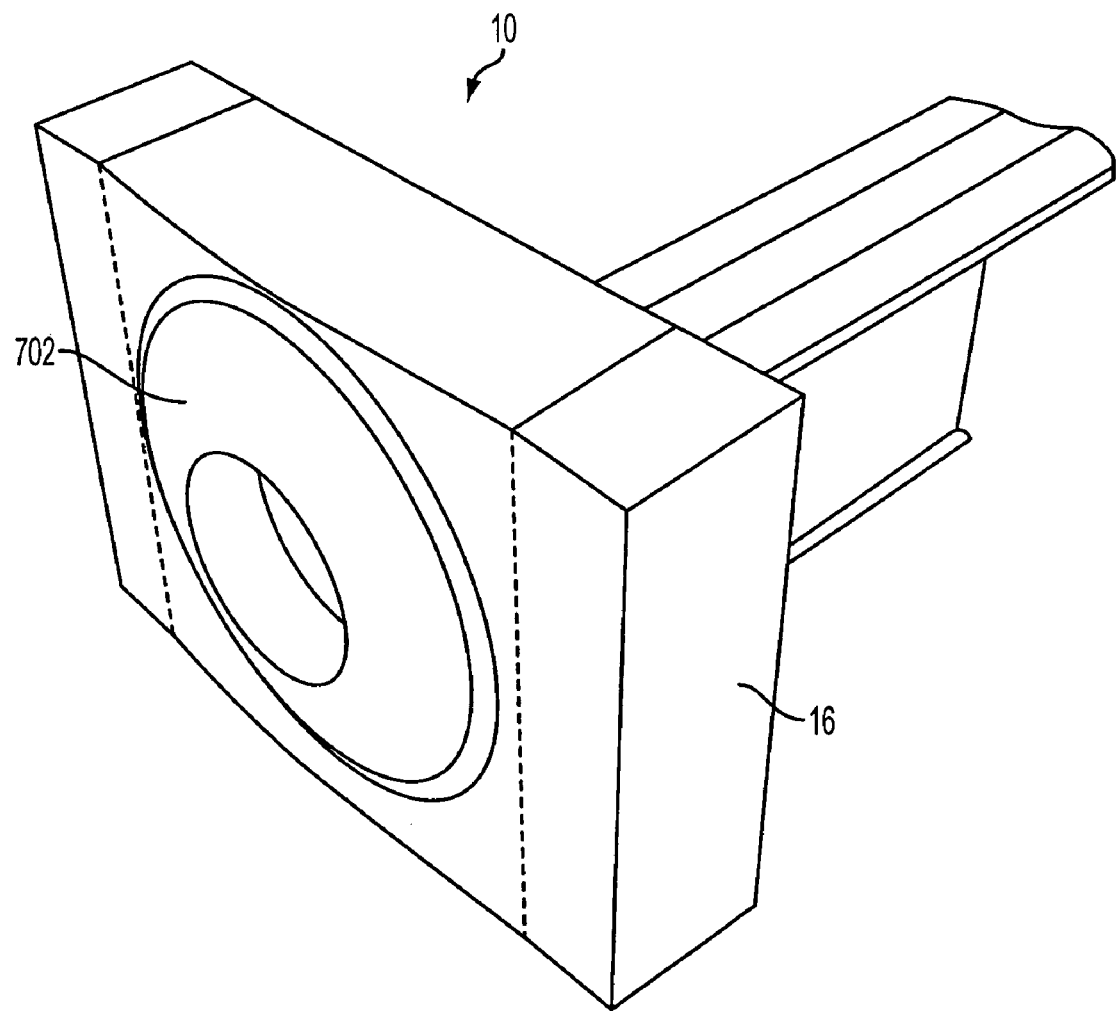
FIG. 7 is a perspective view of an alternate embodiment of the invention.
Figure 8:
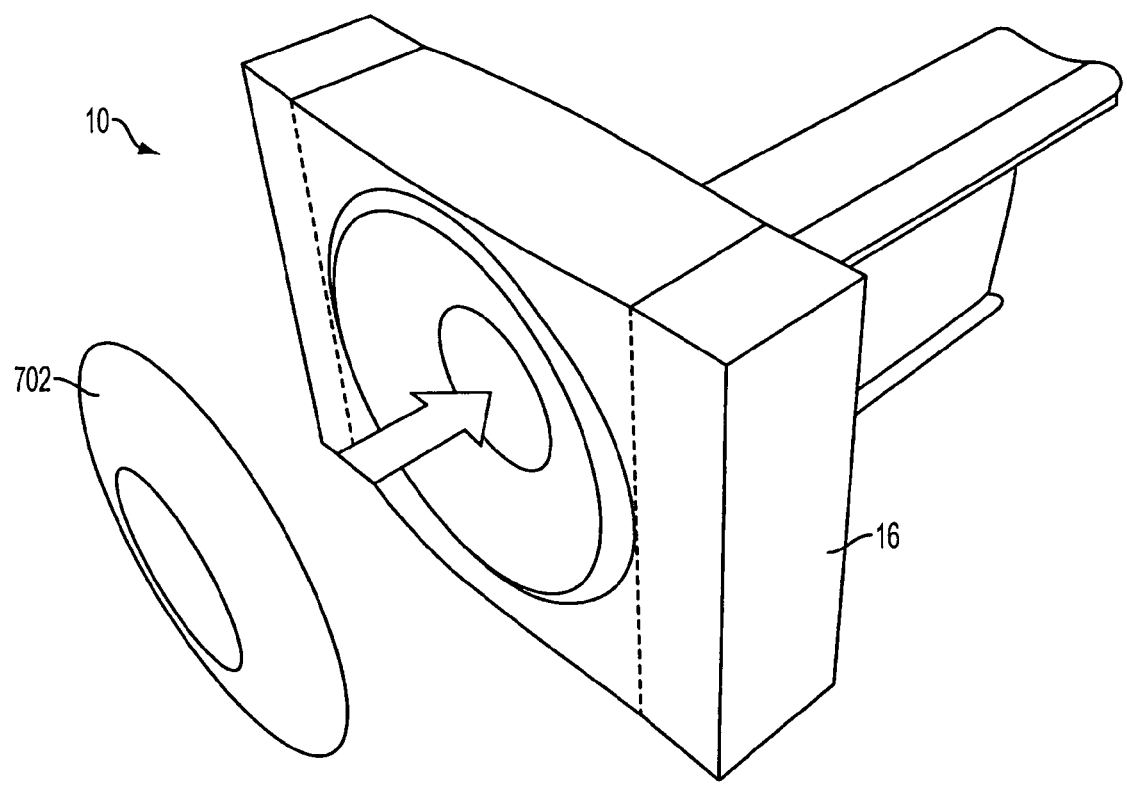
FIG. 8 is a perspective view showing the insertion of the PET module according to the alternate embodiment of FIG. 7 into the stand alone CT imaging device.

FIGS. 7 and 8 show an alternate embodiment of the invention. According to this embodiment, a solid state PET insert module 702 has a ring or disc shape, which is sized to have a snug fit into the tunnel opening of the gantry 16 of the standalone CT imaging device 10. Module 702 similarly includes a plurality of PET scintillation detectors, which preferably comprise APD solid state detectors as shown in the embodiment of FIG. 4, and associated signal processing circuitry for processing signals outputted by the APD detectors for output to an image data processor. In this embodiment, in the absence of a supporting base, it may be desirable to include some manner of locking mechanism to lock the PET insert module 702 in place with respect to the bore of the standalone CT imaging device 10.

Finally, the PET insert module can be utilized for outputting image data and registering PET image data with CT image data. Generally, the system geometries of the two devices are known; that is, the offset between the Field of View (FOV) of the PET insert module and that of the existing CT imaging device are known.

In a first method of registering images, the FOV of the PET system can be positioned using a Patient Positioning Monitor (PPM) in a known manner that is similar to that which is currently done using a stand-alone PET system. Then, the extent of the CT scan can be matched to cover the FOV of the PET scan. In a second method, the extent of the CT scan can be specified to be a sub-portion of that covered in the PPM. In various embodiments, any desired method of specifying can be employed, such as, by way of example, using marker lines on the PPM. In this manner, lines or the like can be used to specify a sub-portion of the PPM image in which to acquire CT image data. Among other things, this can help to limit the amount of x-ray dose delivered to the patient by limiting the extent of the scan (e.g., in the axial direction).

In some embodiments of the above two cases, the only positioning information provided by the existing CT imaging device is the use of laser markers or physical landmarks. In some examples, if this information is not sufficient, then the system can be configured to allow the operator to acquire a CT Tomogram to use in conjunction with the PPM information. In some embodiments, this can be performed routinely, or, alternatively, it can be included optionally, as needed. Accordingly, a third positioning method is contemplated as described below.

In the third method, the PPM can be used in conjunction with a Tomogram (e.g., a CT Tomogram) by displaying PPM information along with the Tomogram image. In some examples, a simplified method of doing this can be to display the extent of the PPM FOV as an annotation overlaid on the Tomogram image. For example, in some embodiments, the system can be configured to enable a user to simply draw a box (such as, e.g., using any computer software GUI methodologies similar to that of other software applications) on the Tomogram indicating the position of the PET FOV. In some more sophisticated methods, the PPM image is stored and that image is overlaid (e.g., using alpha blending or other techniques) with the Tomogram. In some embodiments, the user can then set the extent of the CT scan using the registered data from both modalities.

In some embodiments, the CT FOVs determined by the PET PPM images are treated as initial settings for the extent of the CT scan. In the preferred embodiments, however, the system is configured to allow the user to modify these extents to further refine the area to perform the CT scan. In these cases, it is useful to display the original PPM FOV even when the user has modified the scan extent (e.g., this can be helpful to enable the user to keep track and avoid losing this "landmark" information).

In some embodiments, the various methods described herein may be implemented via one or more computer program products for use with a conventional computer. This implementation may, for example, include a series of computer instructions fixed on a computer readable medium (e.g., a diskette, a CD-ROM, ROM, flash memory, memory stick or the like) or transmittable to a computer system via and interface device, such as a modem or the like. The medium may be substantially tangible (e.g., communication lines) and/or substantially intangible (e.g., wireless media using microwave, light, infrared, Bluetooth, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

While illustrative embodiments of the invention have been described herein, the present invention is not limited to the various preferred embodiments described herein, but includes any and all embodiments having equivalent elements, modifications, omissions, combinations (for example, various aspects in different embodiments can be combined together when appropriate in various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. Apparatus comprising:
  a Computed Tomography (CT) imaging device, said CT imaging device comprising:
  a stationary gantry comprising a housing in which CT radiation source and CT detector are located; and
  a subject table, wherein the housing comprises a bore opening configured to encompass the subject table; and the apparatus further comprises:
  a removable Positron Emission Tomography (PET) insert module, the PET insert module comprising a portion configured to be positioned and retrofitted within the bore opening of the CT gantry housing in an alignment direction therewith to encompass the subject table.

2. Apparatus as recited in claim 1, wherein said PET insert module further comprises a base that supports said PET insert portion, said insert portion extending within the gantry housing.

3. Apparatus as recited in claim 1. wherein said PET insert module further comprises a plurality of scintillation detectors provided therein.

4. Apparatus as recited in claim 3, wherein said plurality of scintillation detectors are solid state detectors.

5. Apparatus as recited in claim 4, wherein said plurality of scintillation detectors are Avalanche Photo Diode (APD) detectors.

6. Apparatus as recited in claim 3. wherein said plurality of scintillation detectors are offset in the alignment direction with respect to the CT detector when the extended portion of said PET insert module is positioned within the bore opening of the gantry housing.

7. Apparatus as recited in claim 1, wherein said PET insert module comprises a disk configuration.

8. Apparatus as recited in claim 7, wherein said PET insert module is securably mounted to said bore opening of said CT imaging device when positioned therein.

9. A Positron Emission Tomography (PET) insert module comprising:
   a housing including a plurality of PET coincidence detectors, said housing comprising a portion configured to be removably inserted in an alignment direction and retrofitted within a bore opening of a gantry of a stationary Computed Tomography (CT) imaging device.

10. A PET insert module as recited in claim 9, wherein said PET insert module further comprises a base that supports said PET insert module portion when said portion is inserted bore opening of said CT imaging device gantry.

11. A PET insert module as recited in claim 9, wherein said PET coincidence detectors comprise a plurality of scintillation detectors.

12. A PET insert module as recited in claim 11, wherein said plurality of scintillation detectors are solid state detectors.

13. A PET insert module as recited in claim 11, wherein said plurality of scintillation detectors are Avalanche Photo Diode (APD) detectors.

14. A PET insert module as recited in claim 9, wherein said plurality of coincidence detectors are offset in the alignment direction with respect to a CT detector of said CT imaging device when said PET insert module is inserted in the bore opening of said CT imaging device.

15. A PET insert module as recited in claim 9, wherein said PET insert module comprises a disk configuration.

16. A PET insert module as recited in claim 15, wherein said disk configuration is securably mounted to said bore opening of said CT imaging device.

* * * * *